(12) United States Patent
Wolf et al.

(10) Patent No.: US 11,061,642 B2
(45) Date of Patent: Jul. 13, 2021

(54) MULTI-CORE AUDIO PROCESSOR WITH FLEXIBLE MEMORY ALLOCATION

(71) Applicant: KNOWLES ELECTRONICS, LLC, Itasca, IL (US)

(72) Inventors: Christopher Konrad Wolf, San Jose, CA (US); Malav Shah, Mountain View, CA (US); Frederic Denis Raynal, San Jose, CA (US); Sean Mahnken, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/649,952

(22) PCT Filed: Sep. 24, 2018

(86) PCT No.: PCT/US2018/052338
§ 371 (c)(1),
(2) Date: Mar. 23, 2020

(87) PCT Pub. No.: WO2019/067334
PCT Pub. Date: Apr. 4, 2019

(65) Prior Publication Data
US 2020/0278825 A1  Sep. 3, 2020

Related U.S. Application Data

(60) Provisional application No. 62/566,137, filed on Sep. 29, 2017.

(51) Int. Cl.
*G06F 3/16* (2006.01)
*G06F 9/50* (2006.01)
*G06F 12/02* (2006.01)

(52) U.S. Cl.
CPC ............ *G06F 3/162* (2013.01); *G06F 9/5016* (2013.01); *G06F 12/0238* (2013.01); *G06F 2212/202* (2013.01)

(58) Field of Classification Search
CPC . G06F 3/165; G06F 3/16; G06F 3/162; G06F 9/30036; G06F 9/5016; G06F 12/0238; G06F 2212/202
See application file for complete search history.

(56) References Cited

U.S. PATENT DOCUMENTS 5,822,598 A   10/1998   Lam
6,070,140 A   5/2000   Tran
(Continued)

OTHER PUBLICATIONS

International Search Report and Written Opinion, PCT/US2018/052338, Knowles Electronics, LLC (dated Dec. 17, 2018).

*Primary Examiner* — Fan S Tsang
*Assistant Examiner* — David Siegel
(74) *Attorney, Agent, or Firm* — Foley & Lardner LLP

(57) ABSTRACT

A multi-core audio processor includes an audio fabric block configured to organize data received from a plurality of audio interfaces into streams for processing by a plurality of digital signal processing cores. The plurality of digital signal processing cores include a single sample processing core and a frame processing core. The multi-core audio processor also includes a pool of undedicated random access memory (RAM) and a main controller configured to dynamically allocate memory resources from the pool of undedicated RAM amongst one or more of the plurality of digital signal processing cores.

20 Claims, 12 Drawing Sheets

(56) References Cited

U.S. PATENT DOCUMENTS

| | | | |
|---|---|---|---|
| 6,154,721 A | 11/2000 | Sonnic | |
| 6,249,757 B1 | 6/2001 | Cason | |
| 6,314,501 B1 | 11/2001 | Gulick et al. | |
| 6,397,186 B1 | 5/2002 | Bush et al. | |
| 6,756,700 B2 | 6/2004 | Zeng | |
| 7,415,416 B2 | 8/2008 | Rees | |
| 7,774,204 B2 | 8/2010 | Mozer et al. | |
| 7,957,972 B2 | 6/2011 | Huang et al. | |
| 8,275,148 B2 | 9/2012 | Li et al. | |
| 8,666,751 B2 | 3/2014 | Murthi et al. | |
| 8,972,252 B2 | 3/2015 | Hung et al. | |
| 8,996,381 B2 | 3/2015 | Mozer et al. | |
| 9,043,211 B2 | 5/2015 | Haiut et al. | |
| 9,112,984 B2 | 8/2015 | Sejnoha et al. | |
| 2006/0074658 A1 | 4/2006 | Chadha | |
| 2011/0138259 A1* | 6/2011 | Tan | H04L 1/0052 714/792 |
| 2012/0232896 A1 | 9/2012 | Taleb et al. | |
| 2012/0310641 A1 | 12/2012 | Niemisto et al. | |
| 2013/0223635 A1 | 8/2013 | Singer et al. | |
| 2014/0163978 A1 | 6/2014 | Basye et al. | |
| 2014/0180457 A1* | 6/2014 | Thakur | G06F 1/3215 700/94 |
| 2014/0244269 A1 | 8/2014 | Tokutake | |
| 2014/0257821 A1 | 9/2014 | Adams et al. | |
| 2014/0274203 A1 | 9/2014 | Ganong et al. | |
| 2014/0278435 A1 | 9/2014 | Ganong et al. | |
| 2014/0281628 A1 | 9/2014 | Nigam et al. | |
| 2014/0343949 A1 | 11/2014 | Huang et al. | |
| 2015/0106085 A1 | 4/2015 | Lindahl | |
| 2015/0112690 A1 | 4/2015 | Guha et al. | |
| 2015/0134331 A1 | 5/2015 | Millet et al. | |
| 2016/0094340 A1* | 3/2016 | Wolrich | G06F 9/3895 713/189 |
| 2016/0142316 A1* | 5/2016 | Wang | H04L 45/54 370/392 |
| 2016/0275043 A1* | 9/2016 | Grochowski | G06F 1/3287 |
| 2017/0078034 A1* | 3/2017 | Maddams | G06F 3/16 |
| 2017/0177359 A1* | 6/2017 | Ould-Ahmed-Vall | G06F 12/084 |
| 2018/0081854 A1* | 3/2018 | Joy | G06F 13/28 |

\* cited by examiner

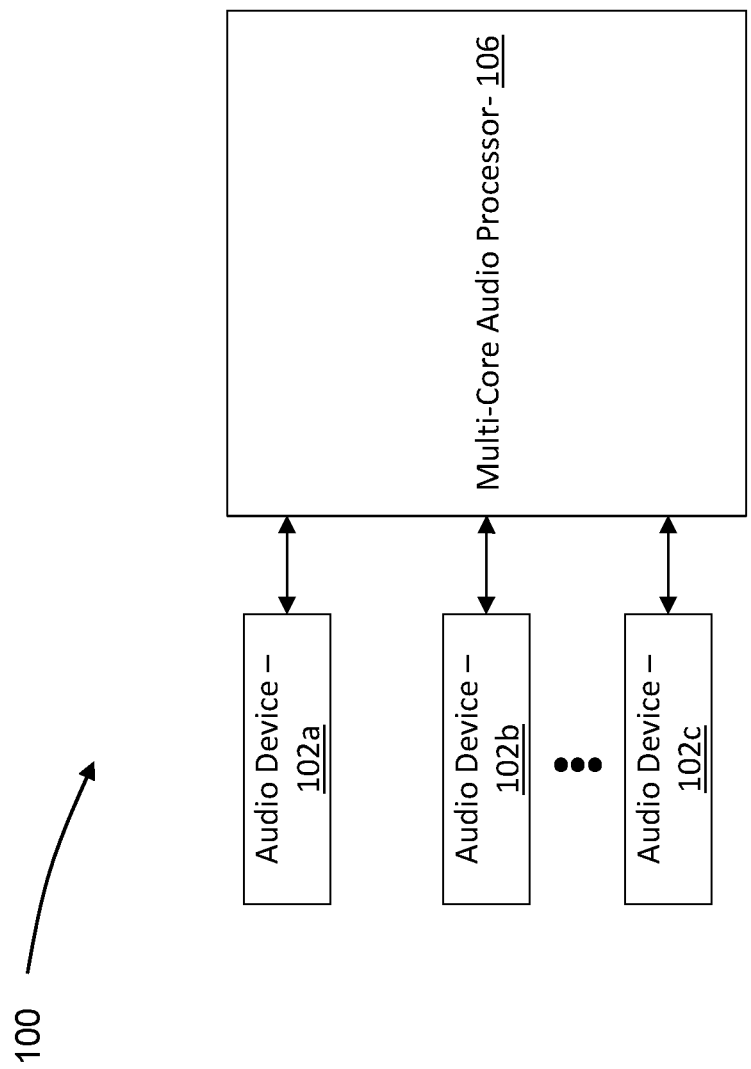

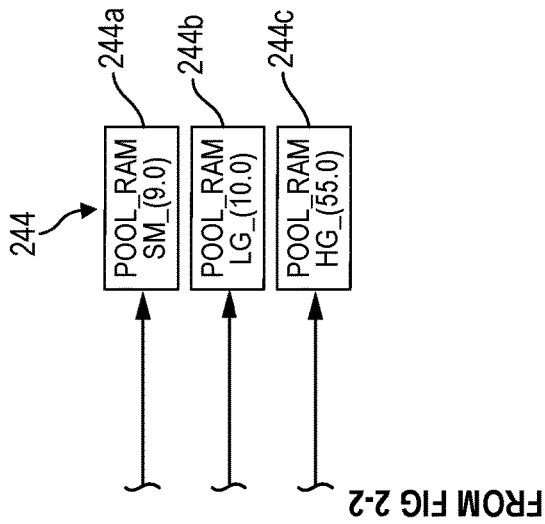

FIG. 2-3

Legend:

DSZ = AHB downsizer = convert 128-bit access to 32-bit bus burst.

USZ = AHB upsize = convert 32-bit burst to wider bus single access.

LUT = Lookup Table memory

CNR = Clock & Reset

MAC = Memory Access Controller = Local to Physical Address Translation + Protection PAC = Processor Inbound Access Controller, System AHB to inbound Local Address Translation + Protection xxx Mem = Dedicated memory for processor xxx. Includes part of physical address decoders, Instruction RAM, Instruction ROM, Data RAM, Data ROM.

2016-10-20v0.8

MULTI-CORE AUDIO PROCESSOR WITH FLEXIBLE MEMORY ALLOCATION

CROSS-REFERENCE TO RELATED APPLICATIONS

This application is a National Stage Application of PCT/US2018/052238, filed Sep. 24, 2018, which claims the benefit of and priority to U.S. Provisional Patent Application No. 62/566,137, filed Sep. 29, 2017, the entire contents of which are incorporated herein by reference.

FIELD OF THE DISCLOSURE

The present disclosure relates generally to audio signal processing and more particularly to multi-core audio signal processors and methods therein.

BACKGROUND

It is often difficult to know or predict all the specific algorithms that will be employed in digital signal processing using a set of audio signal processing cores in a digital signal processor. Different algorithms may also require different amounts of computing resources. Given this, adaptability of the digital signal processor is crucial for providing necessary flexibility.

BRIEF DESCRIPTION OF THE DRAWINGS

FIG. 1 is a block diagram of an environment of a multi-core audio processor.

FIG. 2-1 is a first portion of a schematic diagram of the multi-core audio processor shown in FIG. 1.

FIG. 2-2 is a second portion of the schematic diagram of FIG. 2-1.

FIG. 2-3 is a third portion of the schematic diagram of FIG. 2-1.

FIG. 3 is a block diagram showing interconnections between processing cores and a central memory switch of the multi-core audio processor shown in FIG. 2.

DETAILED DESCRIPTION

Figures 1, 2:
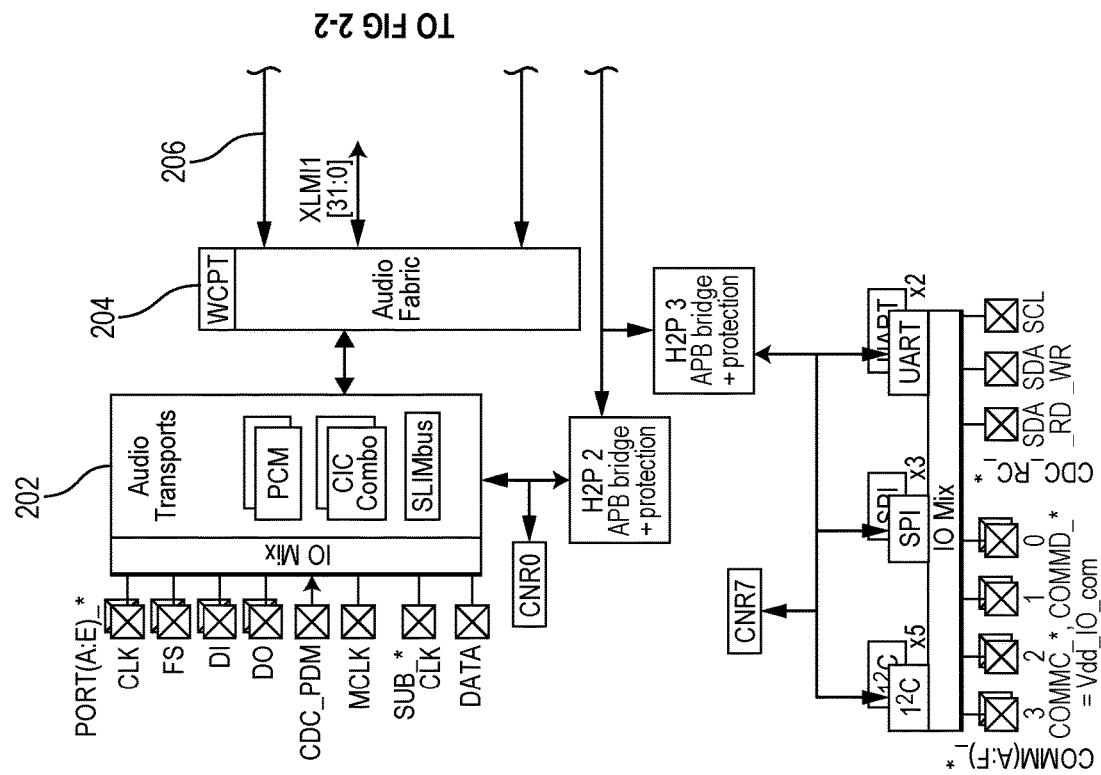
Figure 2:
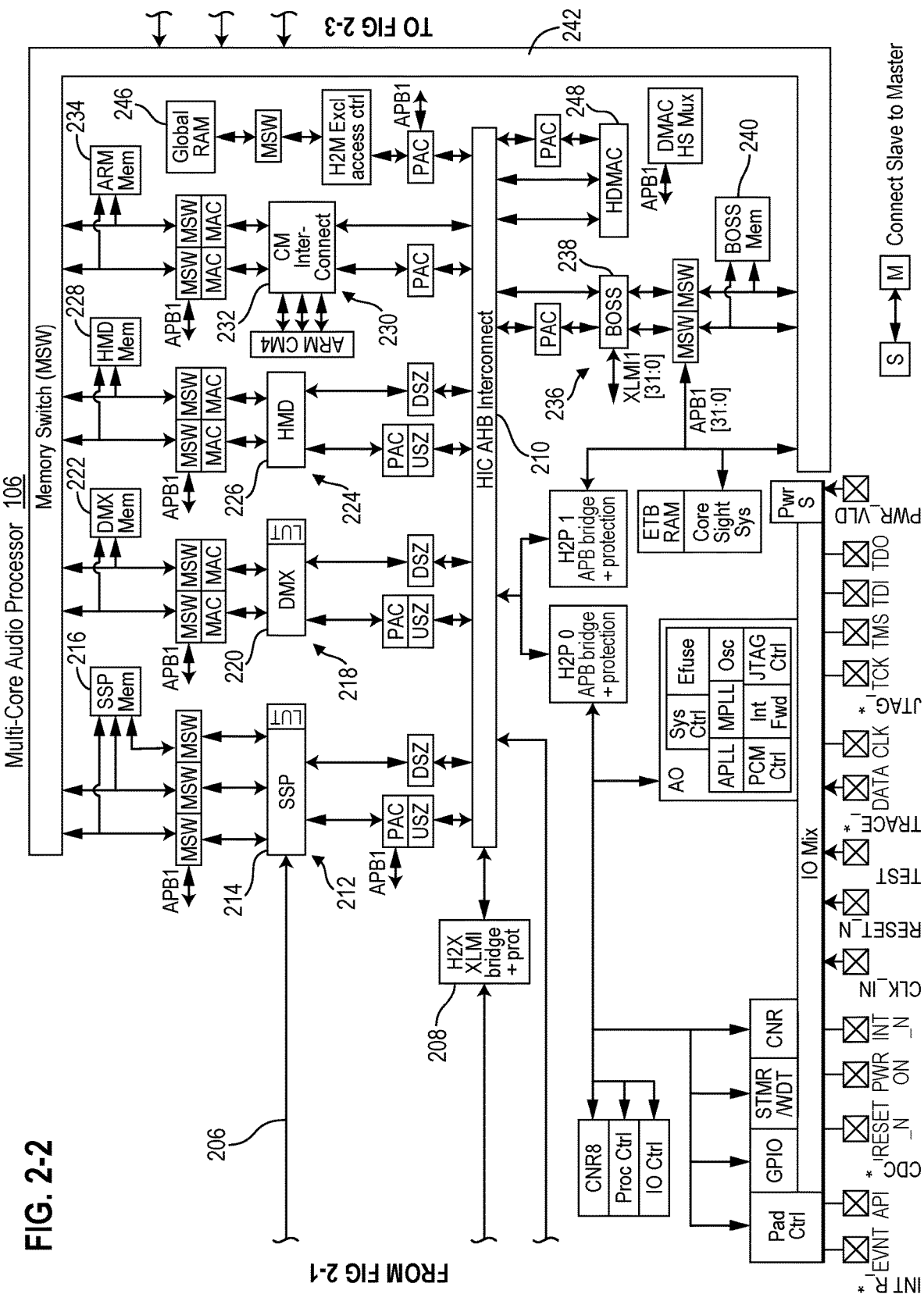

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Referring generally to the figures, disclosed herein is a multi-core audio processor that includes a pool of undedicated memory that is dynamically allocated amongst a number of different processing cores. Some of the processing cores include digital signal processing cores. For example, in one embodiment, the multi-core audio processor includes a single sample audio processing core and at least one frame audio processing core. These audio processing cores may be programmed to execute different processes at the same or different points in time, each requiring differing amounts of memory. Accordingly, the multi-core audio processor includes a pool of undedicated memory that is dynamically allocated amongst the audio processing cores depending on the needs of each processing core. The pool of undedicated memory includes multiple tiles of undifferentiated memory cells. In a first aspect, a central controller configures address translation logic associated with each processing core. The address translation logic is configured to map a logical address output via a processing core to a physical address associated with the undedicated memory. By dynamically configuring the address translation logic, the central controller causes different physical addresses associated with different locations in the undedicated memory to be provided to a central memory switch. In one embodiment, the central controller configures the address translation logic to translate logical addresses provided by the processing core to offset addresses within specific physical regions of undedicated memory.

In another aspect, the central memory switch includes allocation logic configured to enable each of the processing cores to access specific physical regions of the undedicated memory. Via the allocation logic, the central memory switch is configured to enable select lines associated with various sets of multiplexers coupled to each of the processing cores based on the received physical addresses. For example, one set of multiplexers may shift write data received from the processing cores to regions of the undedicated memory based on the addresses received from the processing cores.

In various embodiments, the central controller is configured to dynamically update the address translation logic and allocation logic responsive to needs of each of the processing cores. The entirety of the undedicated memory may be accessible to each of the processing cores in a single cycle. As such, the systems and methods disclosed herein enable efficient sharing of memory between different processing cores running at potentially different data widths and clock rates, thereby providing a highly flexible and cost effective system.

Referring now to FIG. 1, a block diagram of an environment 100 including a multi-core audio processor 106 is shown, according to an example embodiment. Generally, the multi-core audio processor 106 is configured to receive streams of audio data from external audio devices 102a, 102b, and 102c, perform various digital signal processing tasks on the received audio data via a plurality of digital signal processing cores contained therein, and output processed streams of data back to at least one of external audio devices 102a, 102b, and 102c.

In some embodiments, the multi-core audio processor 106 includes at least a single sample processing core and a frame processing core. The sets of routines executed via the single sample processing core and frame processing core are customizable by the user to render audio output data having any suitable form. Due to this customizability, the memory needs for a particular processing core varies depending on the application and the particular routine being executed. For example, a first processing core may need a relatively low amount of memory for execution of a first routine but a relatively large amount of memory for execution of a second routine. The same may hold true for a second processing core and a third processing core. Accordingly, as described herein, the multi-core audio processor 106 includes an undedicated pool of memory. The multi-core audio processor 106 includes a central memory switch and a plurality of address relocation units associated with each of the processing cores, and is configured to dynamically update the regions of the pool of undedicated memory accessible to each of the processing cores via the central memory switch depending on the real-time needs of the processing cores.

In various embodiments, each of the processing cores of the multi-core audio processor 106 can access every memory cell of the pool of undedicated memory with a single cycle latency via the central memory switch. Additionally, the inclusion of the pool of undedicated memory eliminates the need for larger individual memories dedicated to each of the processing cores, thus limiting the size profile of the multi-core audio processor 106. As such, the unique structure of the multi-core audio processor 106 facilitates flexibility of utilization while maintaining a relatively small profile through sharing of undedicated resources.

Referring now to FIG. 2, a schematic diagram providing a more detailed view of the multi-core audio processor 106 of FIG. 1 is shown, according to an example embodiment. As shown, the multi-core audio processor 106 includes, in addition to other components, an audio transport block 202, an audio fabric block 204, a first processing core portion 212, a second processing core portion 218, a third processing core portion 224, a fourth processing core portion 230, and a fifth processing core portion 236. Each of the processing core portions 212, 218, 224, 230, and 236 includes an associated processing core 214, 220, 226, 232, and 238. Each of the processing cores 214, 220, 226, 232, and 238 and the audio fabric block 204 are communicably coupled to a processor interconnection structure 210. The multi-core audio processor 106 further includes a central memory switch 242 communicably coupled to each of the processing cores as well as undedicated memory 244. In various embodiments, each of the previously described components of the multi-core audio processor 106 is located on a single chip. Additionally, as described herein, the central controller processing core 232 is configured to act in concert with the central memory switch 242 and memory interfaces coupling each of the processing cores to the central memory switch to dynamically allocate portions or regions of undedicated memory 244 to one or more of the processing cores.

The audio transport block 202 includes a plurality of data ports configured to receive and transmit audio data from and to external devices. The plurality of data ports include a plurality of groupings of data pins (e.g., data in, data out, clock in, channel select) configured to receive data from external audio devices. The audio transport block 202 includes a plurality of interfaces configured to serialize and de-serialized different types of audio streams. As shown, the audio transport block 202 includes pulse code modulation interfaces, pulse density code modulation interfaces, and a SLIMbus interface to provide flexibility in terms of the types of audio data that may be processed. In alternative embodiments, the audio transport block 202 may include other types of audio interfaces implementing other protocols.

The audio transport block 202 is communicably coupled to the audio fabric block 204. The audio fabric block 204 is configured to maintain an address map for the various streams being serviced via the processing cores. For example, the audio fabric block 204 may include a set of registers configured to store address information associated with buffers storing samples of unprocessed and processed data. The audio fabric block 204 may also include a plurality of memory-mapped data stream multiplexers configured to route data between the buffers and the processing cores to facilitate the processing of the data via the processing cores and the transmittal of the data via the audio transport block 202 to external audio devices.

In various embodiments, the audio fabric block 204 includes a native bus (represented by the double-sided arrow 206) through which at least the processing core 214 directly accesses the address map of the coherent streams maintained by the audio fabric block 204. As such, the native bus 206 provides the processing core 214 with the ability to access data received via the audio transport block 202 with low latency. Alternatively or additionally, the audio fabric block 204 is communicably coupled to the processor interconnection structure 210 via a bridge 208 such that each of the processing cores 214, 220, 226, 232, and 238 may access the mapping data maintained via the audio fabric block 204.

The processor interconnection structure 210 is an interconnection structure amongst various components of the multi-core audio processor 106. The processor interconnection structure 210 may be constructed in accordance with an on-chip interconnection specification such as the Advanced Microcontroller Bus Architecture (AMBA) High-performance Bus (AHB) standard. As such, the processor interconnection structure 210 is configured to arbitrate the transfer of data from master components (e.g., the processing cores 214, 220, 226, 232, and 238) to slave components (e.g., dedicated memories 216, 222, 228, 234, and 240 associated with each of the processing cores 214, 220, 226, 232, and 238 and/or the audio fabric block 204) of the multi-core audio processor 106. In some embodiments, via the processor interconnection structure 210, each of the processing cores 214, 220, 226, 232, and 238 may read data from or write data to various dedicated memories 216, 222, 228, 234, and 240 associated with each of the other processing cores 214, 220, 226, 232, and 238.

In various embodiments, the first processing core 214 is a digital signal processing core, and includes various subcomponents (e.g., a control unit, arithmetic and logic unit, program registers, address registers, an address bus, a data bus, etc.) configured to store and execute various programmed tasks. In various embodiments, the first processing core 214 is a single sample processing core optimized for low-latency multi-channel pre and post conditioning (e.g., filter banks). As described above, the first processing core 214 is communicably coupled to the audio fabric block 204 and processor interconnection structure 210 with single cycle latency. The first processing core 214 processes audio data to write to standard-size, single-channel buffers in, for example, one of the dedicated memories 222, 228, 234, and 240 associated with another one of the processing cores 220, 226, 232, and 238. Additionally, the first processing core 214 may also read from buffers written by other processing cores 220, 226, 232, and 238 into the dedicated memory 216.

In various embodiments, the second and third processing cores 220 and 226 are also digital signal processing cores. For example, in some embodiments, the second processing core 220 is a high-performance frame-based processing core and the third processing core 226 is a low-performance audio frame processing core. As such, the second and third processing cores 220 and 226 may be optimized to perform different forms of block processing on groupings of samples of data received via the audio transport block 202.

In various embodiments, the fourth processing core 232 is a central controller processing core (e.g., an ARM core). The central controller processor 232 is configured to receive requests from the processing cores 214, 220, 226, and 238 to access the pool of undedicated memory 244. In various embodiments, the central controller processor 232 executes an operating system routine that monitors and assigns the undedicated memory 244 to requesting processing cores 214, 220, 226, and 238. As such, as each of the processing cores 214, 220, 226, and 238 performs new processes, new requests will be sent to the central controller processor 232. The central controller processor 232 arbitrates between these requests, identifies regions of the undedicated memory 244 to assign to a requesting processing core, and updates the allocation logic in the central memory switch 242 to enable the processing core to access the identified regions. Additionally, in some embodiments, the central controller processor 232 also updates the memory relocation units (e.g., the programming of the registers contained therein) associated with the processing core portions 212, 218, 224, 230, and 236 such that the logical to physical mapping between the logical addresses provided by the processing cores and the physical location of the undedicated memory 244 is updated. The fifth processing core 238 may be a system controller processor configured to perform system management tasks (e.g., system wakeup).

In addition to including a processing core and an associated dedicated memory, each of the processing core portions 212, 218, 224, 230, and 236 may include any number of additional elements. For example, between each of the processing cores and the processor interconnection structure 210, at least some of the processing core portions may include an AHB upsize unit (denoted USZ in FIG. 2) configured to perform data upsizing to enable the associated processing core to be accessed as slave component. Various components of the multi-core audio processor 106 are interconnected with double sided arrows in FIG. 2. Each of the double sided arrows has a thick arrowhead and a thin arrowhead. As shown, the thick arrowhead always points to a slave component. Additionally, each of the processing core portions may also include a processor inbound access controller (denoted PAC in FIG. 2) coupled to the AHB upsize unit. The processor inbound access controllers are configured to perform inbound local address translation and protection when the associated processing core is acting as a slave component. For when associated processing cores act as master components, each of the processing core portions may also include AHB downsizer configured to convert a wide-bit signal to a narrower-bit bus burst for communicating with other components via the processor interconnection structure 210.

Each of the processing core portions 212, 218, 224, 230, and 236 may also include various components disposed between the processing cores and the central memory switch 242. For example, certain processing core portions may include memory access controllers (denoted MAC in FIG. 2) configured to perform local address translation and protection when the processing cores access the associated dedicated memories of the processing core portions.

Additionally, each processing core portion also includes a plurality of address relocation units (denoted MSW in FIG. 2). The address relocation units are disposed between the processing cores and the central memory switch 242. In various embodiments, the address relocation units are communicably coupled to address busses of the processing cores. The address relocation units are configured to perform computations on logical addresses output via the address busses so as to translate the logical addresses to an address associated with a region of the undedicated memory 244. In this regard, the address relocation units include registers (e.g., a base register and a limit register). Upon receipt of a logical address from a processing, a value stored in the base register may be added to the logical address to generate a reformatted address, and the reformatted address may be compared to another value stored in the limit register. If the reformatted address is under the value stored in the limit register, the re-formatted address corresponds to a physical address associated with a location within the undedicated memory 244 and is provided to the central memory switch 242 for further memory operations described herein. The values stored in the base and limit registers of the address relocation units may be re-configured via the central controller processor 232 so as to update the physical addresses output thereby.

In some implementations, modified addresses provided via the address relocation units are provided to the central memory switch 242, which is configured to decode the modified addresses and determine whether the requesting processing core has permission to access a region of the undedicated memory 244 based on the decoding. To this end, the central memory switch 242 includes allocation logic having a set of programmable registers that configure a programmable address decoder associated with each addressable region of the undedicated memory 244 to decode the address signals provided via the processing cores. The programmable address decoders enable multiplexers to route additional signals received from the processing cores (e.g., memory enable, memory write, memory word enables, and memory write data) to associated regions of the undedicated memory 244 to provide the processing cores with access to the associated region of the undedicated memory 244 (e.g., to read data therefrom or write data thereto). Operation of the central memory switch 242 is described in more detail with respect to FIG. 3.

Still referring to FIG. 2, the multi-core audio processor 106 also includes a global memory 246. The global memory 246 is a protected memory configured to store information necessary to arbitrate system resources between the processing cores. For example, the global memory 246 may store synchronization flags for timing various operations performed via the processing cores. The multi-core audio processor 106 may further direct memory access controller 248 configured to enable various components to directly access system memory independent of any of the processing cores. For example, the direct memory access controller 248 may enable a direct transfer (e.g., a write) to the undedicated memory 244 from the audio transport block 202, thus freeing up the processing core to perform other tasks.

The undedicated memory 244 is an array of undifferentiated blocks of memory cells. In various embodiments, the undedicated memory 244 includes a plurality of pools 244a, 244b, and 244c of memory cells. Each of the memory pools 244a, 244b, and 244c may include tiles of the same width, but different depths. For example, a first pool 244a may have tiles of a first depth, a second pool 244b may have tiles of a second depth smaller than the first depth, and a third pool 244c may have tiles of a third depth smaller than the second depth. In various embodiments, the central controller processor 232 utilizes an addressing scheme that assigns addresses based on the smallest size tile in the undedicated memory. Accordingly, in this example, an address may be assigned to each set of memory cells having a size equal to the size of the tiles in the third pool 244c.

To allocate a region of the undedicated memory 244 to a particular processing core, the central controller processor 232 may update the address relocation units associated with the various processing core portions 212, 218, 224 230, and 236 such that they translate logical addresses provided via the associated processing cores 214, 220, 226, 232, and 238 to associated address ranges of the allocated regions. Additionally, the central controller processor 232 also updates allocation logic in the central memory switch 242. As a result, address decoders in the central memory switch 242 identify the allocated regions based on the addresses provided via the address relocation units, and enable select lines of routing multiplexers contained therein to route memory signals between the processing cores 214, 220, 226, 232, and 238 and the allocated regions.

In some implementations or situations, complete tiles in the pools 244a, 244b, and 244c may be allocated to a particular ones of the processing cores 214, 220, 226, 232, and 238 in their entireties. As such, smaller tiles may be allocated to processing cores 214, 220, 226, 232, and 238 requiring smaller amounts of memory, while larger tiles may be allocated to processing cores 214, 220, 226, 232, and 238 requiring larger amounts of memory. This minimizes waste in allocating the undedicated memory 244 to the processing cores. In other implementations or situations, different portions of tiles of the pools 244a, 244b, and 244c may be allocated to different ones of the processing cores 214, 220, 226, 232, and 238, thus enabling a large range of amounts of the undedicated memory 244 to be allocated amongst the processing cores 214, 220, 226, 232, and 238.

Figure 3:
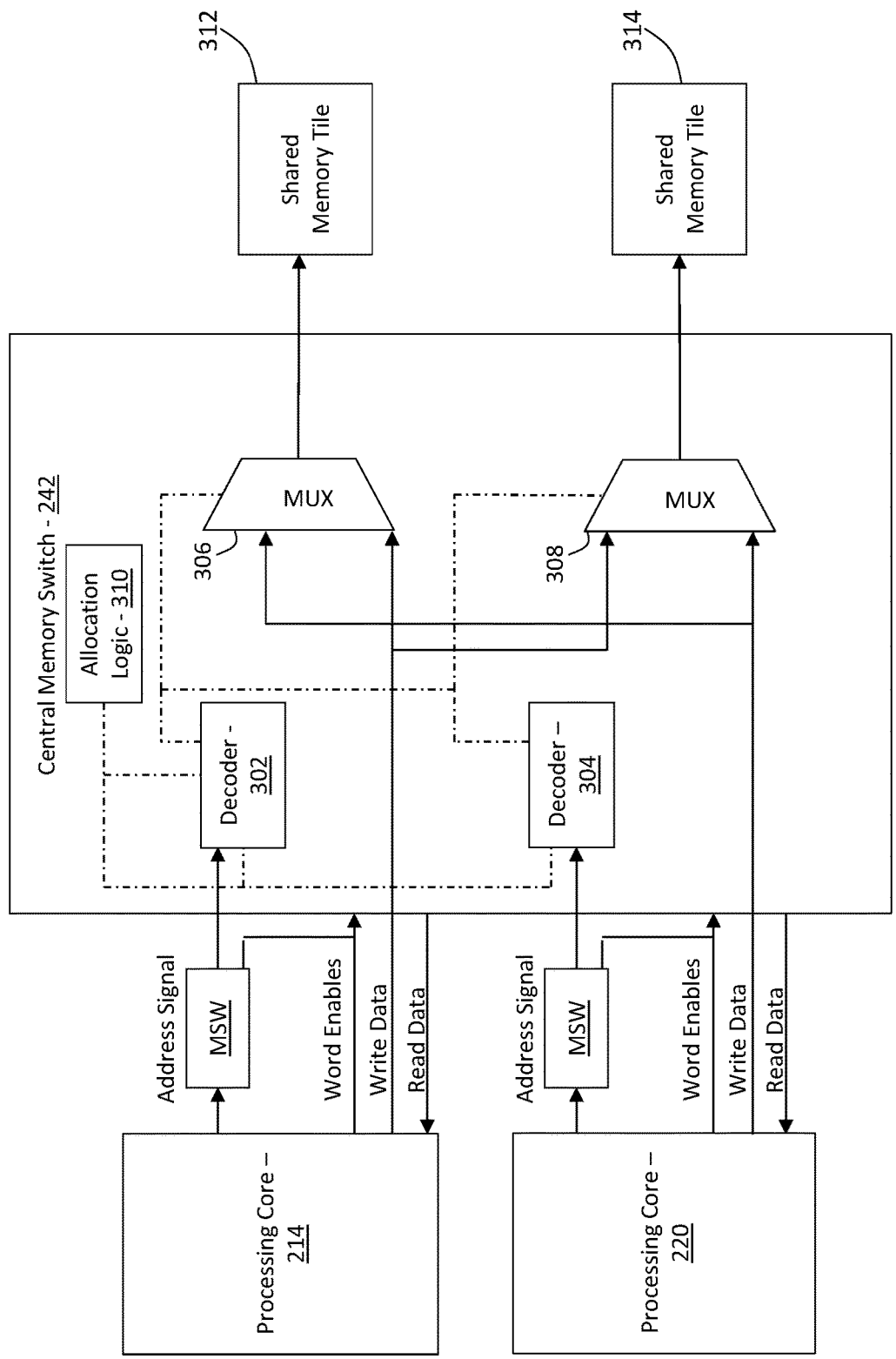

Referring now to FIG. 3, a simplified schematic diagram of the central memory switch 242 is shown, according to an example embodiment. It should be appreciated that several components and interconnections between such components are left out for purposes of visualization. As shown, the first and second processing cores 214 and 220 provide a plurality of signals to the central memory switch 242 via respective memory interfaces associated therewith. Such signals may include memory address signals being of the same width from each of the processing cores 214, 220, 226, 232, and 238, memory enable signals of a single bit, memory write signals of a single bit, and memory word enables having a width corresponding to the number of bytes contained in data to be read or written by the processing core, and memory write data (e.g., corresponding to widths of data busses of the processing cores 214, 220, 226, 232, and 238).

As shown, addresses output via address busses the processing cores 214 and 220 are the same width and output to the address relocation units and 264. In some embodiments, the processing cores 214 and 220 (or any of the other processing cores 226, 232, and 238) may have different data widths. For example, the first processing core 214 may have a maximal data width that is equal to the width of the tiles in the undedicated memory 244 and the second processing core 220 may have half the maximal data width. Other processing cores may have smaller data widths that are powers of two smaller than the maximal data width.

Given this disparity in data widths of the different processing cores 214, 220, 226, 232, and 238, the address relocation units may include different sets of memory address reformatting logic. In the example described above, since the processing core 214 has the maximal data width, the address relocation units associated therewith may not include address reformatting logic. In other words, after a value stored in a base register of the address relocation units is added to a logical address provided by the processing core 214, the re-formatted address is unmodified and at least a portion thereof is provided to the decoders 302 and 304.

In an example, however, the processing core 220 has half the data width of the processing core 214. In such an example, the address relocation units associated with the second processing core 220 include address reformatting logic that converts the least significant bit of the logical memory address to word enables, and then provides only a portion of the modified reformatted address to the decoders 302 and 304. As shown, the word enables are combined with the additional word enables initially generated via the processing core 220. Thus, after the modification of the address signal, there are a set of word enables associated with the processing core 220 that includes one bit for each byte of data to be read from or written to the addressed region of the undedicated memory 244, plus additional word enables generated from the original address signal. In some embodiments, after the address relocation unit, there are a number of word enables associated with each byte of the total width of each addressable region of the undedicated memory 244. The word enable signals are routed to a tile of the pool of undedicated memory and indicate the particular bytes within the addressed region of the memory tile that are to be accessed. Thus, by providing additional word enable signals, the address relocation unit is specifying the particular portion within the addressed region (e.g., an upper half or a lower half) of the tile is be accessed. The shared tile 312, for example, is configured to receive the set of word enable signals and disable a portion of the addressed region based on the set of word enable signals, thus directing the processing core 220 to a particular half of the tile If the processing core 220 has a data width that is a quarter of the width of the undedicated memory 244, the address relocation unit converts an additional bit of the received address signal to such word enables. As such, the address relocation unit re-formats the logical address based on the data width of the processing core to designate a particular lane within the undedicated memory 244 to read data from or write data to. Any of the address relocation units, described herein may be configured to discard varying numbers of bits of the reformatted address depending on the relationship between the data width of the associated processing core 214, 220, 226, 232, and 238 and the maximal data width of the undedicated memory 244.

Figure 4:
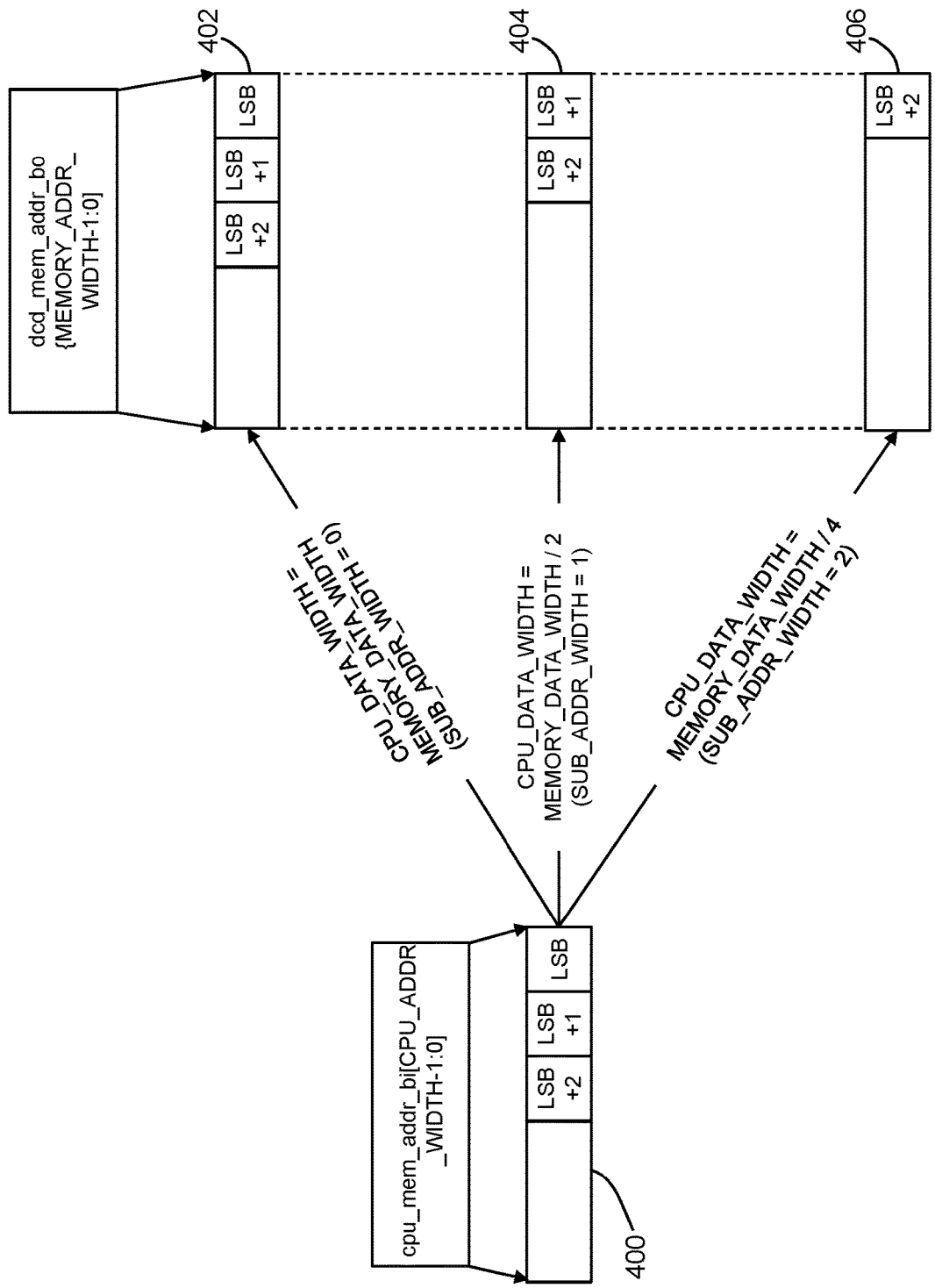
FIG. 4 is a diagram illustrating address reformatting of logical addresses associated with processing cores of different data widths.
Figure 5:
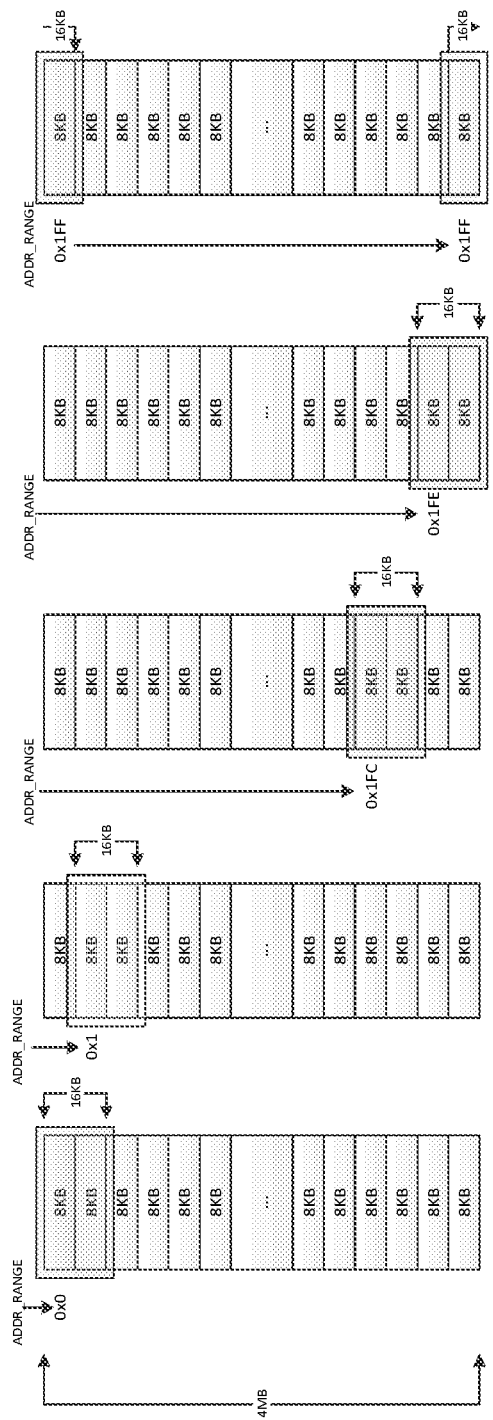
FIG. 5 is a diagram showing potential address ranges of shared memory of a multi-core audio processor.

FIG. 4 provides a visualization of such operations performed via the address relocation units. As shown, an address 400 may be provided by any one of the processing cores 214, 220, 226, 232, and 238. As such, the address 400 may have any number of widths. FIG. 5 shows a formatting of the address 400 in situations where the width of the CPU data bus associated with address 400 is equal in width to the undedicated memory 244, half of the width of the undedicated memory 244, and a quarter of the width of the undedicated memory 244. In a first situation where the width of the CPU data bus associated with address 400 is of a width equal to that of the undedicated memory 244, the entirety of the address 402 (e.g., associated with a particular tile in the undedicated memory 244) is provided to the decoders of the central memory switch 242 to enable an entirety of an addressable location of the pool of undedicated memory 244. In another situation where the width of the CPU data bus associated with address 400 is only half of the memory width, there is more flexibility as to the portion of the identified memory tile that is to be accessed. In other words, a first half of an addressable location may be accessed, or a second half of the addressable location may be accessed. In such situations, the least significant bit of the memory address is converted to a word enable to create a sub-address 404 associated with half the identified memory tile. Similarly, in another situation where the width of the CPU data bus associated with address 400 is a quarter of the memory width, the next most significant bit is also converted to a word enable to create a sub-address 406 associated with a quarter of the identified memory tile. The sub-addresses are then used to only enable portions of the identified tile for the processing core.

Referring again to FIG. 3, re-formatted address signals from the address relocation units are received at decoders 302 and 304. In some implementations, the central memory switch 242 includes an address decoder for each of the processing cores 214, 220, 226, 232, and 238. The decoders 302 and 304 are configured to map addresses provided by the processing cores 214 and 220 to specific regions of the undedicated memory 244. In this regard, the decoders 302 and 304 include comparators configured by sets of programmable registers to identify a particular range that addresses provided by the processing cores 214 and 220 fall into. Portions of the addresses provided via the address relocation units may be used to identify which tile that the processing cores 214 and 220 are addressing. For example, in one embodiment, the undedicated memory 244 includes 90 tiles, so the seven least significant bits of the addresses originating from the address relocation units and 264 are provided to each of the decoders 302 and 304. In various embodiments, the decoders are configured to provide a tile select signal to the tiles 312 and 314 and enable select lines linking an associated set of multiplexers to the processing cores 214 and 220 when the seven least significant bits of an address have predetermined values. For example, the decoder 302 may enable the tile 312 for the processing core 214 upon receiving an address signal from the address relocation unit having seven least significant bits equaling 1111111. Upon enabling the tile 312, multiplexers in the central memory switch 242 may route other signals received from the processing core 214 (e.g., the remainder of the address, write data, word enables, etc.) to the tile 312.

In various embodiments, the decoders 302 and 304 utilize an address granularity associated with the smallest tile in the various pools 244a, 244b, and 244c of the undedicated memory 244. As such, the tiles may be allocated in any order without leaving any address holes. FIG. 5 provides an illustration of the address granularity used by the decoders. In the example shown, a particular tile has a depth of a plurality of 8 KB wide physical pages of memory cells such that the tile has a 4 MB capacity. However, in this example, another tile in the undedicated memory 244 may have tiles having only a depth of two of 8 KB wide physical pages of memory cells. As such, the decoders 302 and 304 utilize an address granularity associated with such smaller tiles. Given this, numerous groupings of contiguous physical pages may correspond to different address ranges. Such a scheme renders each of the tiles within the pools 244a, 244b, and 244c of undedicated memory 244 fungible with respect to the processing cores 214, 220, 226, 232, and 238.

Referring again to FIG. 3, the central memory switch 242 includes allocation logic 310 configured to enable a particular region of the undedicated memory 244 for a processing core. The allocation logic 310 updates the programmable ranges associated with each of the decoders 302 and 304 to update multiplexers enabled thereby, thus changing the tiles in the undedicated memory 244 that memory signals received from the processing cores 214 and 220 are routed to. For example, the central memory switch 242 may include a write data multiplexer associated with each tile of the undedicated memory 244. Each processing core may be communicably coupled to each of the write data multiplexers. Numerous sets of select lines emanating from each decoder of the central memory switch 242 may be coupled to each of the multiplexers. As such, the decoders 302 and 304 utilize the addresses from the processing cores 214, 220, 226, 232, and 238 to transmit select signals via the select lines coupled to a multiplexer associated with a particular tile of the pool of the undedicated memory. As shown, write multiplexers 306 and 308 associated with tiles 312 and 314 of the undedicated memory 244 select write data received from the processing cores 214 and 220 to their associated tiles 312 and 314. Additionally, write enable signals from the processing cores 214 and 220 are also routed to the identified tiles 312 and 314 to commit the selected write data to the undedicated memory 244.

Figure 6:
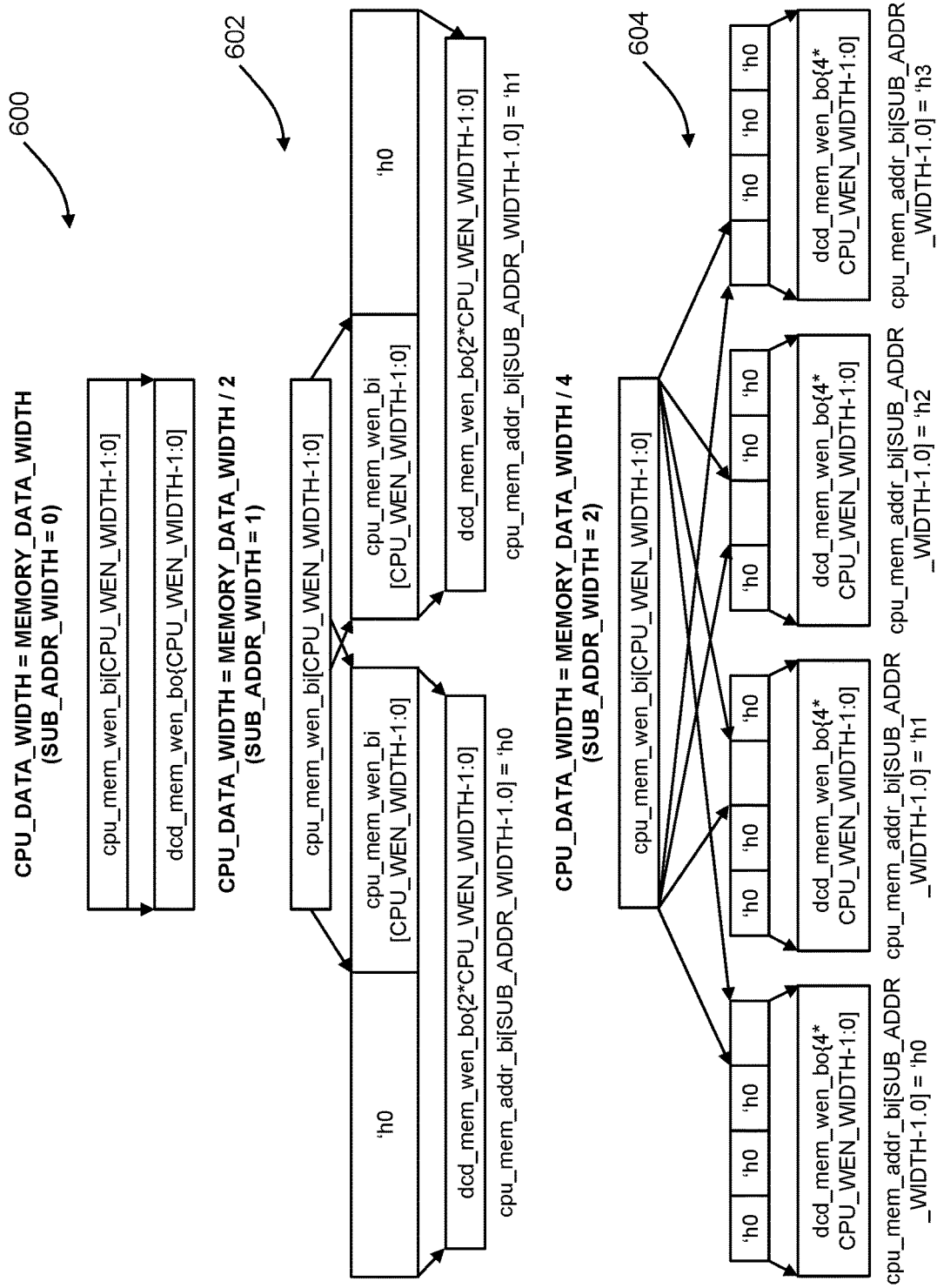
FIG. 6 is a diagram illustrating the shifting of write data of different widths to a shared memory of a multi-core audio processor.

FIG. 6 is a diagram providing a visualization of data being written to various sub-address ranges within a memory tile of the undedicated memory 244. In a first situation 600 a data width provided by a processing core is equal to the width of a memory tile. In such a situation, the write data maps directly into an address range. Given this, a set of word enables is routed to the memory tile such that all of the write data is written to the addressed location after routing via a writing multiplexer. In a second situation 602, the write data is half of the width of the memory tile. In such a situation, additional word enables are routed to the memory tile such that the write data, once shifted by a write multiplexer, is written only to one of two halves associated with the address range. In a third situation 604, the write data is quarter of the width of the memory tile. In such a situation, additional word enables are routed to the memory tile such that the write data, once shifted by a write multiplexer, is written only to one of four quarters associated with the address range.

While not shown, the central memory switch 242 also includes a set of read data de-multiplexers configured to route data already stored in the undedicated memory 244 to requesting processing cores 214 and 220. There may be a read data de-multiplexer associated with each tile in the undedicated memory 244. As such, upon the decoders 302 and 304 identifying tiles associated with the addresses provided by the processing cores 214 and 220, the allocation logic 310 is configured to enable select lines to associated read data de-multiplexers. Memory enables are also routed to the identified memory tile such that the read data stored thereon is read and routed via the read data de-multiplexers to the processing cores 214 and 220.

Figure 7:
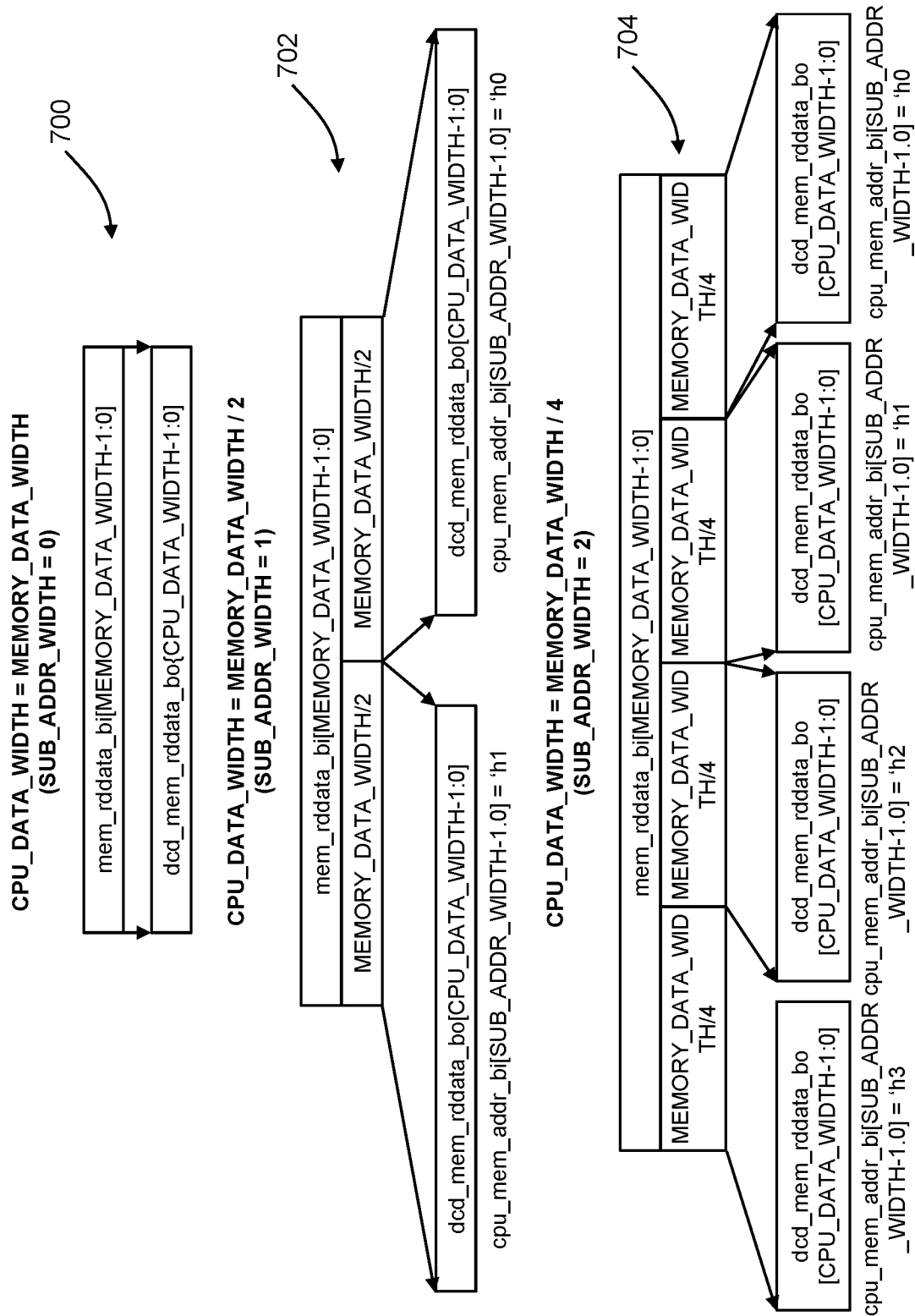
FIG. 7 is a diagram illustrating the shifting of read data of different widths to a shared memory of a multi-core audio processor.

FIG. 7 is a diagram providing a visualization of data being read from various sub-address ranges within a memory tile of the undedicated memory 244. In a first situation 700, the data width provided by a processing core is equal to the width of a memory tile. In such a situation, the read data maps directly into an address range. Given this, a set of word enables is routed to the memory tile such that all of the data is read from the identified address range after routing via a read de-multiplexer. In a second situation 702, the read data is half of the width of the memory tile. In such a situation, additional word enables are routed to the memory tile such that the read data, once shifted by a read de-multiplexer, is read from one of two halves associated with the address range. In a third situation 704, the read data is a quarter of the width of the memory tile. In such a situation, additional word enables are routed to the memory tile such that read data, once shifted by a read de-multiplexer, is read from one of four quarters associated with the address range.

Figure 8:
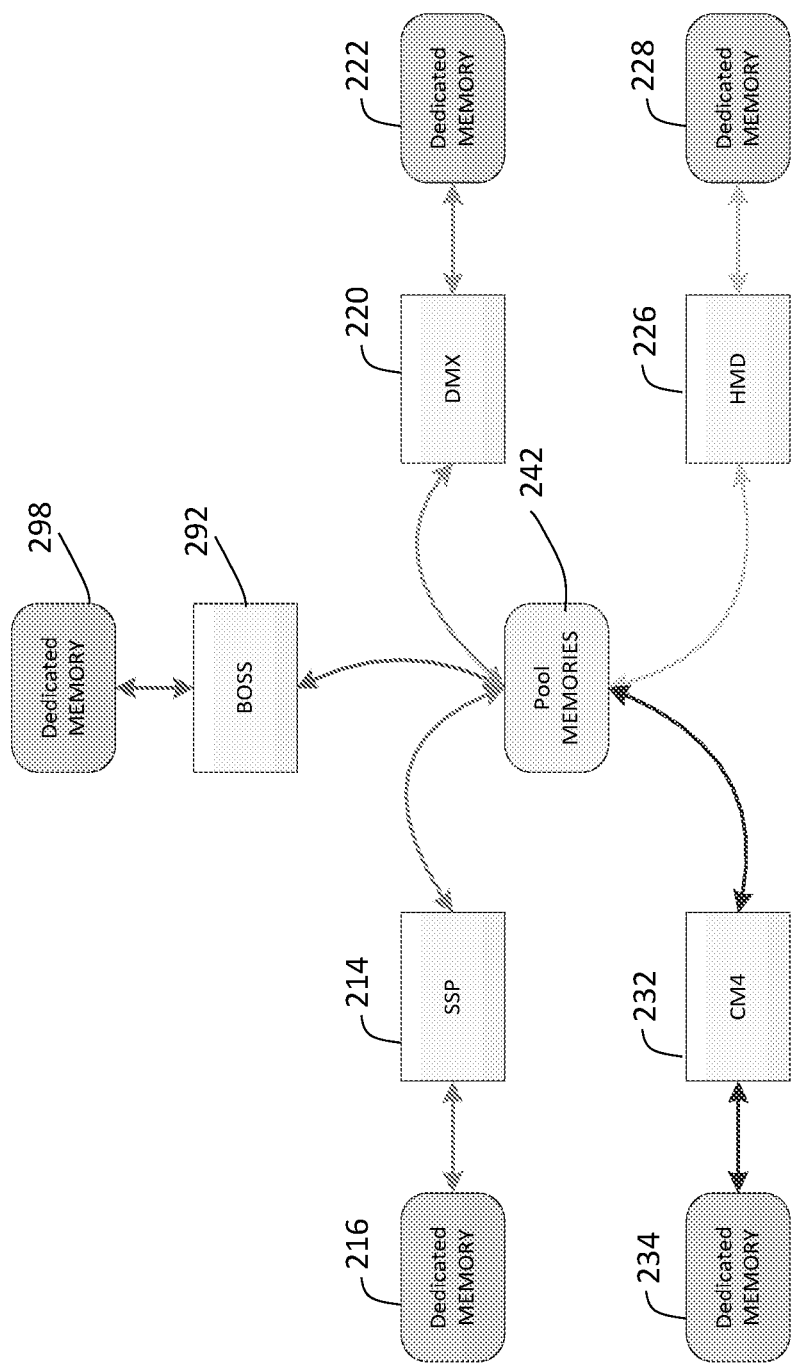
FIG. 8 is a block diagram illustrating accessible memory to each one of a plurality of processing cores in a multi-core audio processor.

Referring now to FIG. 8, a block diagram showing the various memories accessible to each of the processing cores 214, 220, 226, 232, and 238 is shown. In FIG. 8, the curved double edged arrows interconnecting the processing cores 214, 220, 226, 232, and 238 to the undedicated memory 244 represent the write data multiplexers and read data de-multiplexers of the central memory switch 242. By configuring the allocation logic 310 of the central memory switch 242 any portion of the undedicated memory is potentially accessible to any one of the processing cores 214, 220, 226, 232, and 238 in a single cycle. Additionally, each one of the processing cores 214, 220, 226, 232, and 238 can also access its own associated dedicated memory 216, 222, 228, 234, and 234 in a single cycle via standard address decoding logic. Additionally, via the processor interconnection structure 210, each one of the processing cores 214, 220, 226, 232, and 238 may access the dedicated memories 216, 222, 228, 234, and 234 associated with any one of the other processing cores 214, 220, 226, 232, and 238, assuming such permissions to do so have been granted by the central controller processor 232. Because of the accessibility of the undedicated memory 244, however, the dedicated memories 216, 222, 228, 234, and 234 may be relatively small. As a result, the multi-core audio processor 106 may maintain a relatively small profile.

Figure 9:
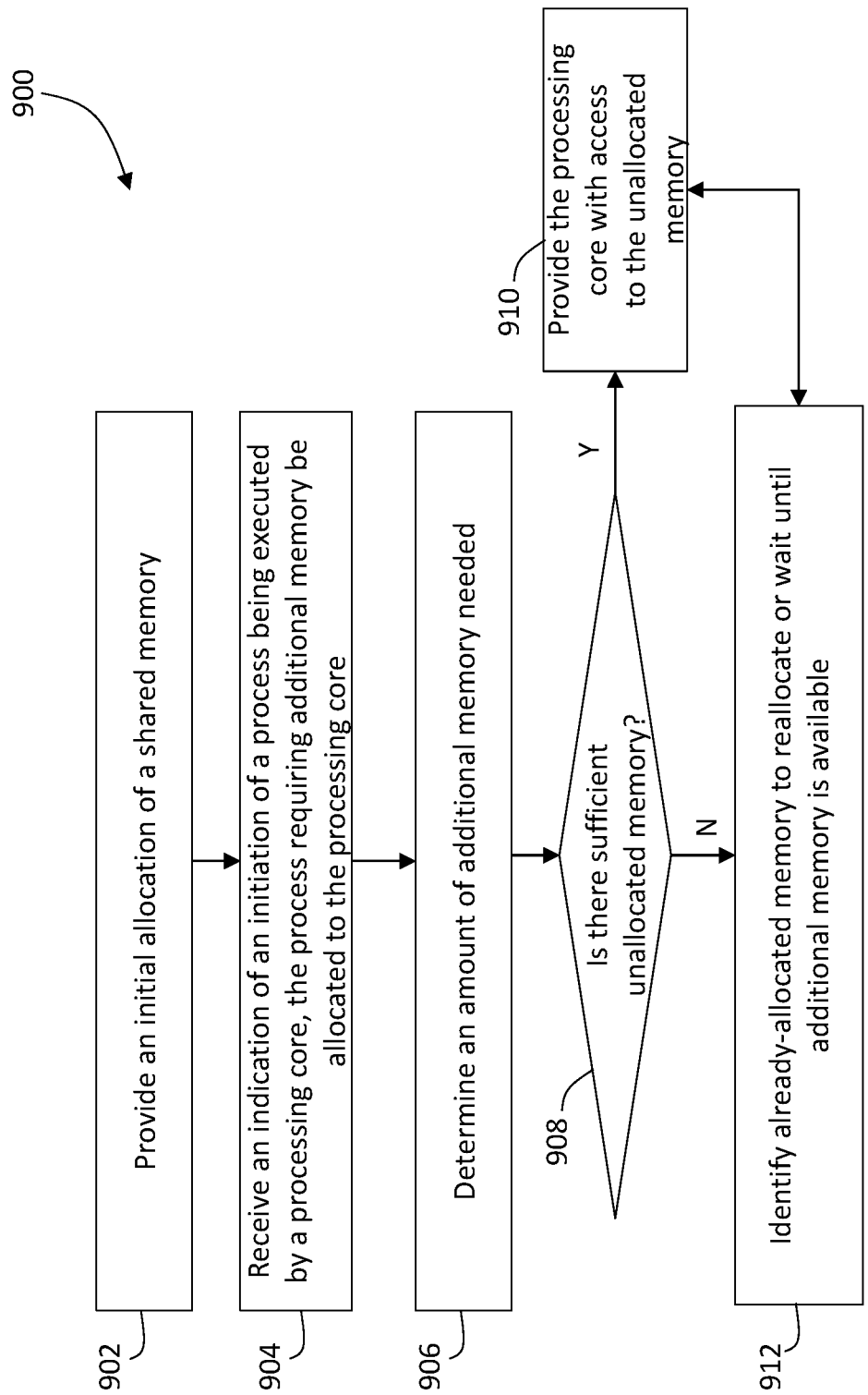
FIG. 9 is a flow diagram of a method of dynamically allocating a portion of undedicated memory of a multi-core audio processor to a processing core.

Referring now to FIG. 9, a flow diagram of a method 900 of dynamically allocating memory amongst a plurality of processing cores is shown, according to an example embodiment. In various embodiments, the method 900 may include fewer or additional operations. The method 900 may be executed via the central controller processor 232 described with respect to FIG. 2 to allocate the undedicated memory 244 described herein between the processing cores 214, 220, 226, 232, and 238.

In an operation 902, the central controller processor 232 provides an initial allocation of the shared memory. For example, upon initiation of the multi-core audio processor 106, the controller may allocate the undedicated memory 244 between the processing cores 214, 220, 226, 232, and 238 with a default allocation. In an example, the default allocation is a previous allocation based on previous processes executed by the processing cores 214, 220, 226, 232, and 238 (e.g., the last processes that were executed). In another example, the default allocation is a predetermined default allocation, for example, pre-programmed into the dedicated memory 234 associated with the central controller processor 232. For example, the predetermined allocation may assign contiguous regions of the undedicated memory 244 to processing cores 214, 220, 226, 232, and 238 having sizes based on common routines executed by the respective processing cores 214, 220, 226, 232, and 238. In some examples, the operation 902 is omitted and, upon initiation of the multi-core audio processor 106, none of the undedicated memory 244 is assigned to any of the processing cores 214, 220, 226, 232, and 238.

In an operation 904, the central controller processor 232 receives an indication of a process being executed by one or more of the processing cores 214, 220, 226, 232, and 238 that requires an amount of memory that is more than currently allocated to the processing core. In an example, the processing core 214 initiates execution of a process (e.g., upon the audio fabric block 204 storing a sample associated with a coherent stream of audio data via the audio transport block 202). Upon initiation of the process, the processing core 214 may transmit a memory request to the central controller processor 232 via the processor interconnection structure 210. The memory request may include an identifier associated with the process being executed by the processing core 214. It should be understood that the central controller processor 232 may receive a number of such indications from a number of different ones of the processing cores 214, 220, 226, 232, and 238, as the processing cores 214, 220, 226, 232, and 238 may initiate execution of process simultaneously or substantially simultaneously. As such, any subsequent operations described herein may be performed multiple times.

In an operation 906, the central controller processor 232 determines an amount of additional memory needed by the processing core. For example, in some embodiments, the memory request provided by the one of the processing cores 214, 220, 226, 232, and 238 includes an amount of memory needed. For example, a processing core initiating execution of a process may determine an amount of memory needed based on an amount allocated thereto in accordance with the default allocation and include the determined amount in the request.

In an operation 908, the central controller processor 232 determines if there is sufficient unallocated memory to enable the requesting processing core to execute the initiated process. In various embodiments, at least a portion of the undedicated memory 244 is left unallocated amongst the processing cores 214, 220, 226, 232, and 238 to enable additional regions of the undedicated memory 244 to be allocated to any of the processing cores 214, 220, 226, 232, and 238 in response to real-time processing needs. Thus, the central controller processor 232 may compare the amount of memory requested by the processing core to the size of the unallocated portion or a sub-region thereof. For example, if there is a sufficient amount of unallocated memory cells in a region of the undedicated memory 244 adjacent to memory cells already allocated to the requesting processing core, the central controller processor 232 may determine that there is sufficient unallocated memory. In another example, the unallocated memory cells needn't be adjacent to the memory cells already allocated to the requesting processing core.

In an operation 910, if there is sufficient unallocated memory, the central controller processor 232 provides the requested processing core with access to the unallocated memory. In this regard, the central controller processor 232 may perform actions to update memory address relocation units associated with the requesting processing core. In an example where the first processing core 214 requests additional memory, the central controller processor 232 may re-program a set of registers in the address relocation units disposed between the first processing core 214 and the central memory switch 242. As a result, certain logical addresses provided via an address bus of the first processing core 214 are translated to new addresses associated with the newly allocated undedicated memory 244. Additionally, allocation logic within the central memory switch 242 is updated to enable select lines of multiplexers such that data is routed between first processing core 214 and the newly allocated undedicated memory 244 in response to receiving the translated addresses.

In an operation 912, if there is insufficient unallocated memory available, the central controller processor 232 may either identify already-allocated memory to reallocate to the requesting processing core or wait until additional memory is available. For example, depending on the process being executed or the identity of the requesting processing core, the central controller processor 232 may delay execution of a process by another processing core and re-allocate memory to the requesting processing core. In other words, certain ones of the processing cores 214, 220, 226, 232, and 238 may take priority in terms of access to unallocated memory. For example, in some embodiments, the first processing core 214 takes priority. In such embodiments, in response to receiving a memory access request from the first processing core 214 in a situation where insufficient undedicated memory is available, the central controller processor 232 may delay execution of a process by another one of the processing cores and re-allocate memory to the first processing core 214 by performing the operation 910. As such, the central controller processor 232 may dynamically arbitrate requests for additional undedicated memory 244 received from the processing cores 214, 220, 226, 232, and 238 based on a pre-configured prioritization scheme.

In some embodiments, rather than reallocating already-allocated memory, the central controller processor 232 waits for additional memory to become available. For example, after the processing cores 214, 220, 226, 232, and 238 finish execution of various processing tasks, indications of their completions may be provided to the central controller processor 232, which, in response, may de-allocate memory to render additional undedicated memory 244 available to the requesting processor. Once the additional undedicated memory 244 becomes available, the central controller processor 232 may perform the operation 910 to allocate the additional undedicated memory 244 to the requesting processing core. As such, the central controller processor 232 dynamically enables execution of various processes by each processing core 214, 220, 226, 232, and 238 requiring varying amounts of memory.

In some embodiments, the region of undedicated memory 244 that is allocated to the requesting processing core depends on the amount of memory requested. As described herein, the undedicated memory 244 may include memory pools 244*a*, 244*b*, and 244*c* having tiles of the same width, but different depths. Thus, the tiles in each of the pools 244*a*, 244*b*, and 244*c* store varying amounts of data. As such, the region of undedicated memory 244 allocated to a requesting processing core may be identified based on the size of the tiles as well as the amount of requested memory. For example, in response to a processing core requesting an amount of memory above a certain threshold, the central controller processor 232 may allocate memory of a pool having the largest tile size (e.g., depth) to the processing core to minimize the number of tiles allocated to the requesting processing core.

Figure 10:
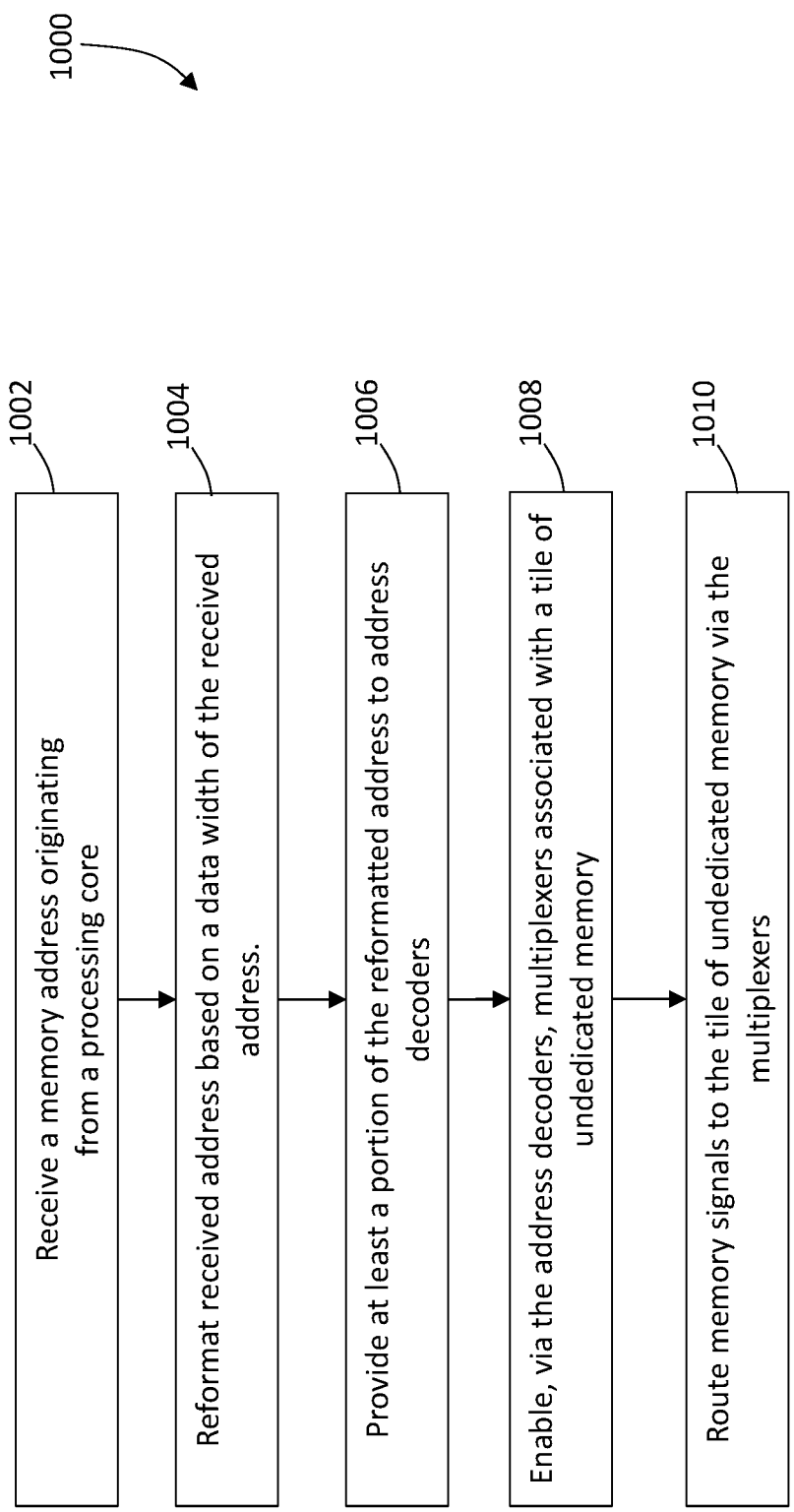
FIG. 10 is a flow diagram of a method of mapping an address received from a processing core of a multi-core audio processor to an allocated region of undedicated memory

Referring now to FIG. 10, a flow diagram of a method 1000 of mapping an address received from a processing core of a multi-core audio processor to an allocated region of undedicated memory is shown, according to an example embodiment. In various embodiments, the method 1000 may include fewer or additional operations.

In an operation 1002, a memory address is received from a processing core. For example, one or more of the processing cores 214, 220, 226, 232, and 238 may generate a logical address during the execution of a process or routine. The logical addresses may be received by an associated address relocation unit. In an operation 1004, the received logical address is reformatted based on a data width of the received address. In an example, the address relocation units associated with the processing core 214 may add a value stored in a base register to the logical address received from the processing core 214 to generate a reformatted address. Additional operations may be performed depending on address formatting logic contained in the address relocation units. For example, where the processing core 214 has a data width equal to a maximal data width of the undedicated memory 244, the entirety of the reformatted address is used for an address provided to an associated tile of the pool of undedicated memory. If the processing core has a data width equal to half the maximal data width, the least significant bit of the reformatted memory address may be converted to a set of word enables, and only the remainder of the address is used for an address provided to an associated tile.

In an operation 1006 at least a portion of the reformatted address is provided to address decoders. For example, upon reformatting the address received from the processing core 214, the address relocation units may provide the re-formatted address to address decoders in the central memory switch 242. The central memory switch 242 may include one address decoder associated with each processing core in the multi-core audio processor 106. Portions are provided to these decoders. In an operation 1008, one of the decoders enables select lines of sets of multiplexers of an associated tile. For example, in response to the portion of the reformatted address received from the processing core 214 having an associated value, a decoder associated with a first tile of the undedicated memory 244 may enable an associated set of multiplexers. The set of multiplexers may include a multiplexer for each signal to be routed from the processing core 214 to the associated memory tile (e.g., write data, word enable signals, the remaining portion of the re-formatted memory address).

In an operation 1010, memory signals are routed from one of the processing cores 214, 220, 226, 232, and 238 to the memory tile via the enabled set of multiplexers. For example, a remaining portion of the re-formatted address may be provided to the memory tile to designate a location to which data is to be read from or written to. A set of word enables may enable particular memory cells contained in the addressed location to cause data to be written to sub-locations associated with the address (e.g., a first half, a second half). Since the central memory switch 242 and address relocation units, 264, 276, 286, and 292 are re-programmable via the central controller processor 232, the particular regions of memory accessed via performance of the method 1000 varies depending on the configuration, thus rendering any region within the undedicated memory 244 accessible to any of the processing cores 214, 220, 226, 232, and 238.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A multi-core audio processor comprising:
    an audio fabric block configured to organize physical data streams received from a plurality of audio interfaces into logical data streams for processing by a plurality of digital signal processing cores,
    the plurality of digital signal processing cores including a single sample processing core and a frame processing core;
    a pool of undedicated random access memory (RAM); and
    a main controller configured to dynamically allocate memory resources from the pool of undedicated RAM amongst one or more of the plurality of digital signal processing cores.

2. The multi-core audio processor of claim 1, further comprising a central memory switch communicably coupled to each of the digital signal processing cores, the main controller, and the pool of undedicated RAM, the central memory switch comprising a set of decoders associated with regions of the undedicated RAM and a set of multiplexers communicably coupled to the decoders, wherein each one of the decoders is configured to enable select lines of one of the set of multiplexers to route data between one of the plurality of processing cores and associated one of the regions of the undedicated RAM responsive to receiving an address within a predetermined range.

3. The multi-core audio processor of claim 2, further comprising a plurality of address relocation units, the plurality of address relocation units including at least one address relocation unit disposed between each one of the plurality of digital signal processing cores and the central memory switch, wherein the address relocation units include a programmable register storing an address relocation value, wherein the address relocation units are configured to add the address relocation value to logical addresses received from the plurality of digital signal processing cores to generate reformatted addresses that correspond to the regions of the undedicated RAM.

4. The multi-core audio processor of claim 1, wherein the pool of undedicated RAM includes a plurality of memory tiles, at least some of the memory tiles having different sizes, and wherein the main controller is configured to dynamically allocate one or more memory tiles to one or more of the plurality of digital signal processing cores based on resource requirements of the one or more of the plurality of digital signal processing cores.

5. The multi-core audio processor of claim 1, wherein the plurality of digital signal processing cores includes a higher power audio frame processing core and a lower power audio frame processing core.

6. The multi-core audio processor of claim 4, wherein the plurality of digital signal processing cores further includes an additional processing core configured to perform system wakeup and control tasks.

7. The multi-core audio processor of claim 1, further comprising a separate, dedicated block of RAM associated with each of the plurality digital signal processing cores.

8. The multi-core audio processor of claim 7, further comprising a processor interconnection structure communicably coupled to the audio fabric block, each of the plurality of digital signal processing cores, and a central memory switch, wherein each of the dedicated blocks of RAM is accessible to every one of the plurality of digital signal processing core via the processor interconnection structure.

9. The multi-core audio processor of claim 8, further comprising a global RAM, separate from the dedicated blocks of RAM and the pool of undedicated RAM.

10. The multi-core audio processor of claim 1, wherein the pool of undedicated RAM includes a plurality of memory tiles having a common data width.

11. The multi-core audio processor of claim 10, wherein at least two of the plurality of memory tiles have different depths.

12. The multi-core audio processor of claim 1, wherein the undedicated RANI allocated to one or more of the plurality of digital signal processing cores include separate contiguous regions of local addressable memory accessible to the one or more digital signal processing cores with single-cycle latency.

13. A system comprising:
    a plurality of audio processing cores having differing processing capabilities;
    a pool of undedicated random access memory (RAM); and
    a central memory switch comprising:
        a first processing core interface configured to receive a first address signal from a first digital signal processing core of the plurality of audio processing cores, the first digital signal processing core having a first data width that is equal to a data width of the undedicated RAM;
        a plurality of programmable address decoders associated with various portions of the pool of undedicated RAM, wherein a first programmable address decoder of the plurality of programmable address decoders includes address decoding logic configured to identify a portion of the undedicated RAM allocated to the first digital signal processing core based on the first address signal; and
    a first multiplexor communicably coupled to the first programmable address decoder configured to shift write data received from the first digital signal processing core to the identified portion of the undedicated RAM.

14. The system of claim 13,
    wherein the central memory switch comprises: a second processing core interface configured to receive a second address signal from a second digital signal processing core of the plurality of audio processing cores, the second digital signal processing core having a second data width that is less than the data width of the undedicated RAM, wherein the plurality of programmable address decoders includes a second programmable address decoder configured to identify a portion of the undedicated RAM allocated to the second digital signal processing core based on the second address signal; and
    a second multiplexor communicably coupled to the second programmable address decoder, the second multiplexer configured to shift write data received from the second digital signal processing core to the portion of the pool of undedicated RAM allocated to the second digital signal processing core.

15. The system of claim 13, wherein the undedicated RAM includes a plurality of memory tiles sharing a data width, but having differing depths, wherein the plurality of programmable address decoders includes a programmable address decoder associated with each one of the plurality of memory tiles.

16. The system of claim 15, wherein programmable registers of the central memory switch allocate individual tiles of the pool of undedicated RAM to the plurality of audio processing cores via the plurality of programmable address decoders.

17. The system of claim 13, wherein the central memory switch further comprises a third multiplexer configured to select read data stored in the identified portion of the undedicated RAM to the first digital signal processing core.

18. A method in a multi-core audio processor, the method comprising:
receiving, by a central controller of the multi-core audio processor, an indication of an execution of a first process by a first digital signal processing core on a first audio signal of a plurality of audio signals that are distributed amongst a plurality of digital signal processing cores;
identifying, by the central controller, a first contiguous region of an unallocated memory pool to allocate to the first digital signal processing core in response to receiving the indication; and
updating, by the central controller, allocation logic associated with a central memory switch of the multi-core audio processor to cause data resulting from the execution of the first process to be routed to or from the first contiguous region.

19. The method of claim 18, further comprising:
receiving, by the central controller, an indication of an execution of a second process by a second digital signal processing core on a second audio signal from the plurality of audio signals;
identifying, by the central controller, a second contiguous region of the unallocated memory pool to allocate to the second digital signal processing core in response to receiving the indication; and
updating, by the central controller, the allocation logic to cause data resulting from the execution of the second process to be routed to or from the second contiguous region.

20. The method of claim 19, further comprising, in response to receiving the indication of the execution of a first process, configuring, by the central controller, an address relocation unit associated with the first digital signal processing core by updating a value in a programmable register to cause the address relocation unit to add the updated value to a logical address output by an address bus of the first digital signal processing core.

* * * * *